United States Patent [19] [11] 4,310,636
Bartz [45] Jan. 12, 1982

[54] COPPER ADHESIVE COMPOSITION

[75] Inventor: Kenneth W. Bartz, Baytown, Tex.

[73] Assignee: Exxon Research & Engineering Co., Florham Park, N.J.

[21] Appl. No.: 946,894

[22] Filed: Sep. 28, 1978

Related U.S. Application Data

[63] Continuation of Ser. No. 746,930, Dec. 8, 1976, abandoned, which is a continuation of Ser. No. 554,276, Feb. 28, 1975, abandoned, and Ser. No. 340,061, Mar. 12, 1973, abandoned.

[51] Int. Cl.$^3$ ........................ C08L 51/04; C08L 51/06
[52] U.S. Cl. ........................................ 525/71; 525/193
[58] Field of Search ........................... 260/836; 525/71

[56] References Cited

U.S. PATENT DOCUMENTS

| | | | |
|---|---|---|---|
| 3,600,347 | 8/1971 | Godair | 260/27 |
| 3,862,265 | 1/1975 | Steinkamp | 260/878 |
| 3,868,433 | 2/1975 | Bartz | 260/876 R |

*Primary Examiner*—Paul Lieberman
*Attorney, Agent, or Firm*—D. A. Roth; M. B. Kurtzman

[57] ABSTRACT

Specific thermoplastic compositions which are formulated to be exceptionally useful for adhesion to copper-containing metals are prepared from either glycidyl acrylate grafts of polypropylene based formulations with a minor elastomeric component or low density polyethylene based formulations grafted with acrylic acid and/or glycidyl acrylate and containing a minor elastomeric component.

3 Claims, No Drawings

COPPER ADHESIVE COMPOSITION

This is a continuation of application Ser. No. 746,930, filed Dec. 8, 1976, which is a continuation of prior application Ser. No. 554,276, filed Feb. 28, 1975, which is a continuation of prior application Ser. No. 340,061, filed Mar. 12, 1973, all now abandoned.

CROSS REFERENCES TO RELATED APPLICATIONS

This application is not related to any other application owned by the same assignee but it is an improvement over commonly assigned U.S. Pat. No. 3,862,265, entitled "POLYMERS WITH IMPROVED PROPERTIES AND PROCESS THEREFOR" filed Apr. 3, 1972, which is incorporated herein in its entirety, by reference, and it is relevant to a copending, commonly assigned application with the same filing date as Ser. No. 340,061, entitled "FASTENER ARTICLE" Ser. No. 340,446 filed Mar. 12, 1973, now Ser. No. 659,317, filed Feb. 19, 1976 by the same inventor.

PRIOR ART

Copper is a notoriously difficult substrate to adhere materials to since it has a highly oxidized surface and bonds can readily rupture through the failure of an oxide layer when oxygen diffuses through the adhesive. Certain epoxy adhesives conventionally known are used for bonding materials to copper but they usually give rise to weak intermediate layers which ultimately result in bond failure. Whatever success is obtained by the art in adhering materials to a copper substrate, usually results from the use of bright, clean copper which has been mechanically abraded or which has been vapor decreased and acid etched.

Conventionally a ferric chloride/nitric acid aqueous solution is used to obtain the bright copper. The copper surfaces can also be primed with a silane such as an amino silane to improve copper bonding.

A recent patent, U.S. Pat. No. 3,342,647, teaches that bonding of copper sheets can be obtained by using urea, formamide, or hexamethylene tetramine which is decomposed thermally and conventional adhesive then applied to such an activated surface.

Conventional type adhesives which are used to bond copper include epoxides hardened with polyamine, or an ionomer resin, a class of polymers in which ionized carboxyl groups create ionic crosslinks, such as Surlyn obtained from DuPont. If hot-melts are to be used, then nylon-type polyamides or polyhydroxy ether polymers can be used.

SUMMARY OF THE INVENTION

Specifically formulated acrylic acid or a glycidyl acrylate grafts containing a flexible, e.g. elastomeric component, can be used as copper adhesives without elaborate copper surface preparation.

DESCRIPTION OF THE INVENTION WITH PREFERRED EMBODIMENTS

In the Steinkamp and Grail Ser. No. 240,494 application and now U.S. Pat. No. 3,862,265, and the copending application entitled "FASTENER ARTICLE", a detailed description is given to a new class of grafted polymers which are prepared preferably by a novel technique and which demonstrate unusual adhesion capabilities for numerous substrates. Surprisingly it has been found that most of the compositions prepared according to the Ser. No. 240,494 application and now U.S. Pat. No. 3,862,265 exhibited excellent adhesion properties over a wide range of substrates but do not have minimum adhesion capabilities towards copper.

It has been discovered and forms the basis of this invention that certain highly specific compounds specially formulated and falling within the generic class described in the above mentioned applications, will exhibit outstanding adhesion to copper. Indeed in a direct comparison with the DuPont Surlyn the specific products of the invention are at least equivalent in one instance and highly superior in other instances.

The specific novel formulations set forth herein will vary in their adhesive values towards copper over a range slightly better than Surlyn to a range more than twice the adhesive value of Surlyn.

Generally speaking the special copper adhesion thermoplastic compositions of the invention can be classified as either polyethylene based or polypropylene based.

When they are polyethylene based, the significant factor in their formulation and composition is that direct grafting with either a glycidyl acrylate component or an acrylic acid component to a polyethylene base, without additional modification of the base formulation, results in compositions which do not adhere well to copper.

In order to obtain maximum copper adhesion values with a polyethylene based system, there must also be included in the formulation a minor amount of an elastomeric component. Such an elastomeric component can be any elastomer which is compatible with polyethylene, generally low unsaturated varieties being preferable. Suitable examples include ethylene propylene copolymers, butyl rubbers, polyisobutylene, ethylene vinyl acetate, and the like.

Very generally, it will be found that the polyethylene based copper adhesive composition of the invention will comprise 60 to 97, preferably 80 to 95, and most preferably 85 to 92 weight percent of the low density polyethylene blended with a balance of elastomer such as butyl rubber, polyisobutylene, or ethylene propylene copolymer.

This blend is then grafted with from about 0.02 to 20, preferably 0.1 to 10, and most preferably 0.2 to 8 weight percent of acrylic acid or glycidyl acrylate. The grafting is preferably carried out in accordance with the procedures of Steinkamp and Grail, Ser. No. 204,494 and now U.S. Pat. No. 3,862,265, which has been incorporated herein in its entirety by reference.

When referring to a polypropylene based copper thermoplastic adhesive formulation, it is also important to note that direct grafting or incorporation of acrylic acid or glycidyl acrylate into the polypropylene per se results in little or minimal copper adhesive values, unless melt temperatures of at least 500° F. are used.

It is only when an ethylene/propylene copolymer component either elastomeric or in the form of a reactor copolymer or a similar elastomeric component such as described above, e.g. butyl rubber, polyisobutylene and the like, is introduced in minor quantities into the polypropylene based formulation, followed by grafting with either acrylic acid or glycidyl acrylate that outstanding copper adhesion results can be obtained.

The other important criteria when operating with polypropylene based formulations, is that the grafting monomer of choice is the glycidyl acrylates, since in those situations exceptionally high adhesion values to copper can be obtained, especially when compared to a standard of the industry such as Surlyn.

Very generally, it is found that blends of 60 to 97, preferably 70 to 95, and most preferably 70 to 92 weight percent of a polypropylene blended with a balance of elastomer or reactor copolymer and then grafted with from about 0.02 to 20, preferably 0.1 to 10, and most preferably 0.2 to 8 weight percent of acrylic acid or, most preferably, glycidyl acrylate, will adhere to copper or copper alloy substrates. Glycidyl acrylate grafts are particularly outstanding for achieving maximum copper adhesion.

The components of the copper adhesion compositions can be blended together and grafted, or they can be grafted separately and then blended and formulated together. The person skilled in the art will choose whichever is most convenient.

Additional details need not be given here since the Ser. No. 240,494 application has complete descriptions.

Although this application and invention is expressly directed to specific, narrowly-defined thermoplastic and adhesive compositions, which display outstanding adhesion for copper, it is to be noted that an important feature of this invention is that the preferred copper adhesion formulation contains either a reactor copolymer of ethylene and propylene or an elastomeric component in relatively minor proportions.

This apparently increases the mobility of the adhesive composition and promotes additional adhesion. However, the phenomenon is more broadly applicable than for just formulations prepared for copper adhesion.

It is applicable to all the grafted formulations disclosed not only in this application, but in related copending applications, which are copending with Ser. No. 240,494.

Moreover, it has also been noted and discovered and is an important facet of the technology involved with these grafted formulations, that inclusion of a relatively minor, e.g. 2 to 30, preferably 5 to 20, most preferably 5 to 15 weight percent of an elastomeric component such as described above, results in a formulation, particularly as respects a polypropylene based formulation in which drastic quenching, such as water soaking to promote adhesion is rendered unnecessary.

In other words, very good and perhaps maximum adhesion values can be obtained with polypropylene and high density polyethylene based formulations in which a small elastomeric component is included without the necessity for a quench. Obviously this is a process feature of significant economic value.

The adhesive thermoplastic formulations of the invention can also be more precisely defined by additional criteria, i.e. their melt-flow rate (MFR) or their melt index (MI). Generally, as this number increases, the ability of the adhesive formulation to wet the copper substrate increases. Therefore, the MFR or MI of the particular formulation used will vary over a range of from about 1 to 300, preferably 2 to 50, and more preferably 2 to 35.

Although glycidyl acrylate and acrylic acid monomers are especially preferred and demonstrated grafting monomers for this invention, other closely related monomers would be expected to be equivalents.

The term reactor copolymer as used herein is intended to refer to isotactic crystalline polypropylene which has been modified as made in the reactor with ethylene sequences, either alternating or in blocks to improve its impact performance at low temperatures. This is a common commercial expedient.

It should also be emphasized that the elastomeric component can be added to the base polymer when in the form of an impact blend, sometimes incorrectly referred to as impact copolymer. This blend will usually have varying proportions of polypropylene, high density polyethylene and an elastomer such as ethylene propylene copolymers.

The invention will be further illustrated by the following examples:

EXAMPLE 1

In this example a series of formulations containing various quantities of polypropylene or polyethylene were blended together, either with or without any additional modifying elastomeric or reactor copolymer components.

Either films or pads were prepared from the formulation and they were melted between two copper strips, allowed to cook, and a standard ASTM peel value determination was made on these strips.

The results are summarized below in Table I.

TABLE 1

Copper/Thermoplastic Peel Adhesion Values

| Sample # | Sample Form[1] | MFR (MI) | $-C_2=$ Content[2] | Wt. % (M) or (R)[2a] | Wt. % Monomer[3] A.A. | Wt. % Monomer[3] G.A. | (Copper) Peel Value Lbs/1¼" Width |
|---|---|---|---|---|---|---|---|
| Propylene "Based" Formulation | | | | | | | |
| (1) | Pad | 350 | 0 | 0 | 6 | — | 1 |
| (2) | Film | 7 | 6 | 10 M | 1 | — | 1.5–3.0 |
| (3) | Film | 31 | 6 | 10 M | 5 | — | 1.5 |
| (4) | Pad | 95 | 6 | 10 M | 6 | — | 1 |
| (5) | Pad | 250 | 7 | 15[6] | 6 | — | 1 |
| (6) | Film | 8 | 15 | 25 M | 1 | — | 1 |
| (7) | Film | 15 | 15 | 25 M | 3 | — | 1–1.5 |
| (8) | Film | 5 | 30 | 50 M | 1 | — | 1–2 |
| (9) | Film | 10 | 25 | 25 R | 7 | — | 2–3 |
| (10) | Film | 5 | 25 | 25 R | — | 3 | 15–16 |
| (11) | Pad | 5 | 25 | 25 R | — | 3 | 12–14 |
| (12) | Pad | 30 | 6 | 10 M | — | 2 | 20–22 |
| LDPE "Based" Products | | | | | | | |
| (13) | Film | (10) | >97 | — | — | 2 | 2 |
| (14) | Film | (25) | >96 | — | 3 | — | 1–1.5 |
| (15) | Film | (11) | >94 | — | 5 | — | 2–2.5 |
| (16) | Film | (2) | >85 | — | 3 | — | 8–10[4] |
| (17) | Film | (2) | >85 | — | 3 | — | 2–3 |
| (18)[7] | Film | (−8) | >95 | — | −3 | — | 2–3 |
| (19)[8] | Pad | — | >90 | — | — | — | 8–9[5] |

[1]Samples were prepared from either 1.5–2.5 mil film or 6–8-inch compression molded pads.
[2]In these samples, the ethylene ($C_2=$) is present either in the form of an impact blend (M) or reactor copolymer (R). The (H) and (R) notations are reported under the sample # heading. Samples having $C_2=$ values greater than 85% were prepared from LDPE.
[2a]M is a blend of 20 wt. % high molecular weight isotactic polypropylene, 40 wt. % high density polyethylene, and 40 wt. % ethylene/propylene copolymer elastomer.
[3]A.A. = Acrylic Acid, G.A. = Glycidyl Acrylate
[4]Sample contains 10 wt. % butyl rubber.
[5]Sample was provided by and party.
[6]15 wt. % ethylene propylene copolymer elastomer.
[7]Ethylene (acrylic acid copolymer). (Union Carbide DQDA2300)
[8]Ionomer. (Dupont Surlyn).

As can be seen from the data in the above Table, excellent results are obtained with respect to only a few specially formulated compositions, since just directly grafting the polypropylene or polyethylene with either acrylic acid or glycidyl acrylate is not adequate to provide outstanding adhesion properties to copper, under normal conditions except that glycidyl grafted polypropylene will adhere to copper if the melt temperature is at least 500° F.

It is also an important part of the invention that the copper adhesive formulations will also adhere very well to many other common ferrous and nonferrous metals, as well as thermoplastics, thermosets and other surfaces. Examples of specific laminates include

| Copper |
|---|
| ferrous metals |
| aluminum |
| lead |
| zinc |
| mylar |
| nylon |
| nitrile type polymers |
| wood |
| glass |

In addition any of the metals listed can be bonded to each other with the adhesives of this invention as well as the Steinkamp-Grail application

What is claimed is:

1. A thermoplastic adhesive composition having outstanding adhesion to copper comprising a blend of
   (a) about 90 weight percent of polypropylene; and
   (b) about 10 weight percent of an elastomeric impact blend comprising polypropylene, high density polyethylene and ethylene/propylene copolymer elastomer;
   wherein both said polypropylene and said elastomeric impact blend have been grafted with from 0.02 to 20 weight percent of a monomer selected from glycidyl acrylate.

2. A thermoplastic adhesive composition having outstanding adhesion to copper comprising a blend of
   (a) about 75 weight percent of polypropylene; and
   (b) about 25 weight percent of a reactor copolymer of ethylene and propylene;
   wherein both said propylene and said reactor copolymer have been grafted with from 0.02 to 20 weight percent of a monomer selected from glycidyl acrylate.

3. The thermoplastic adhesive composition of claim 1 wherein said component is an elastomer impact blend comprising about 20 weight percent polypropylene, about 40 weight percent high density polyethylene and about 40 weight percent ethylene/propylene copolymer elastomer, said elastomeric impact blend being present in an amount of about 10 weight percent.

* * * * *